(12) United States Patent
Winokur (10) Patent No.: US 6,625,704 B2
(45) Date of Patent: Sep. 23, 2003

(54) DATA BACKUP METHOD AND SYSTEM USING SNAPSHOT AND VIRTUAL TAPE

(75) Inventor: Alexander Winokur, Haifa (IL)

(73) Assignee: SANgate Systems, Inc., Southborough, MA (US)

( * ) Notice: Subject to any disclaimer, the term of this patent is extended or adjusted under 35 U.S.C. 154(b) by 219 days.

(21) Appl. No.: 09/923,384

(22) Filed: Aug. 8, 2001

(65) Prior Publication Data

US 2003/0037211 A1 Feb. 20, 2003

(51) Int. Cl.[7] .......................... G06F 12/08; G06F 13/00
(52) U.S. Cl. ..................... 711/162; 711/100; 711/112
(58) Field of Search ................................ 711/100, 112, 711/154, 162, 202

(56) References Cited

U.S. PATENT DOCUMENTS

| | | | | |
|---|---|---|---|---|
| 4,564,903 A | * | 1/1986 | Guyette et al. | 711/201 |
| 5,239,659 A | * | 8/1993 | Rudeseal et al. | 714/6 |
| 6,038,639 A | * | 3/2000 | O'Brien et al. | 711/114 |
| 6,219,770 B1 | * | 4/2001 | Landau | 711/162 |
| 6,269,431 B1 | | 7/2001 | Dunham | |
| 6,353,878 B1 | | 3/2002 | Dunham | |
| 6,366,987 B1 | | 4/2002 | Tzelnic et al. | |
| 6,393,537 B1 | | 5/2002 | Kern et al. | |

* cited by examiner

Primary Examiner—Tuan V. Thai
(74) Attorney, Agent, or Firm—Hale & Dorr, LLP (57) ABSTRACT

A method of creating a snapshot copy of data stored on a first direct access storage device is described. It includes the acts of receiving information identifying a set of data that is to be copied from the first direct access storage device and mapping destination locations in a second direct access storage device for each element of the set. The destination locations are in a sequence emulating a tape copy. The method also includes the acts of iterating through the set of data. For the each element of the set, the method of the present invention also includes the acts of determining if the element has already been copied to the second direct access storage device, and, if the element has not already been copied, then copying the element to its mapped location in the second direct access storage device. A corresponding system is also described.

30 Claims, 8 Drawing Sheets

DATA BACKUP METHOD AND SYSTEM USING SNAPSHOT AND VIRTUAL TAPE

BACKGROUND

1. Field of the Invention

The present invention relates to computer data management and, more specifically, to a system and method that create a snapshot copy of data from a source disk to a virtual tape implemented with a destination disk.

2. Discussion of Related Art

Conventionally, computer systems for processing and maintaining large amounts of data generally include different types of mass data storage devices. Two examples of such mass data storage devices are (1) direct access storage devices, such as disk devices; and (2) sequential access storage devices, such as tape devices. To improve reliability and maintainability, data stored on a disk device is backed-up (i.e., copied) to tape devices on regular intervals. In this fashion, if the disk device fails, the tape copy may be used to re-create the data to the image it had at the time of the back-up.

One technique for backing up data employs "virtual tape" technique in which a disk device is used to simulate, or emulate, a tape device. In short, this technique scans a source disk for data to be backed up, location by location, and sequentially writes the scanned data to the virtual tape created on a destination disk. As such, the technique stores data on the destination disk as if the data is being stored on a physical tape. In particular, data stored in the virtual tape disk includes tape overhead information (e.g., tape header and trailer labels) in addition to the data itself. The data stored in the virtual tape is also arranged as a series of sequentially organized tape records. As data is read from the source disk, this technique creates a corresponding tape record data structure and stores that onto the virtual tape disk. Access to the data stored on the virtual tape disk is also sequential, just as it is to real tape. An advantage of this technique is that it is simple to copy the data stored on the virtual tape to physical tapes, and what is more, the same backup tools used with real tapes can be used with virtual tapes too.

When the virtual tape is to be copied to a physical tape, it is possible to fit more than one virtual tape thereto, thereby using tapes more efficiently. In addition, restore operations (i.e., copying data from the virtual tape disk back to the source device) can be completely automated since no human intervention is required when using the virtual tape technique, whereas a restore operation from physical tapes requires human interventions (e.g., locating and mounting correct tapes).

A disadvantage of the above-described technique is that it may require a long backup window period during which the source disk cannot be used by the computer system. That is, while data is being backed up to a tape/virtual tape, the source disk is made inaccessible so that data copied to the destination disk is identical to the data stored on the source disk at one instant in time, i.e., the time at which the backup began. This is needed to maintain data coherency, as the copied data corresponds to a given instant.

Another backup technique developed for data backup that reduces the length of the backup window is called a snapshot technique, which includes two stages in backing up the data. During the first stage, an exact duplicate of the disk to be backed up is created on another disk called a snapshot disk. This exact duplicate is called a snapshot copy. This technique creates a disk image of data as it existed when the snapshot copy was initiated, while permitting new updates to the "to be backed up" disk during the creation of the snapshot disk. These updates do not propagate to the snapshot disk. In the second stage, the data stored in the snapshot disk is copied to a tape device. The backup window is shortened because the source disk may be accessed and updated as soon as the snapshot copy operation is initiated.

To permit updates while the snapshot copy is in progress snapshot copy is created by the following two processes:

1. A normal data copy process. Data is read, in the order as it is scanned from the source disk, and copied to the snapshot disk. As part of this process, a data structure, created to keep track of which portions of the data have been copied, is accessed to determine whether a portion of the data to be copied, has already been copied to the snapshot disk. The process does not copy data that has already been copied to the snapshot disk as part of an "out-of-order data copy," which is described below.

2. Out-of-order data copy. The out-of-order data copy process takes place when an update is requested by the computer during the normal data copy process. More specifically, upon receiving the update request, it is determined whether the update request is targeting a data location that has already been copied as part of the normal data copy process. If the data has already been copied, the update is performed and the normal data copy process resumes. If the targeted location has not yet been copied as part of the normal data copy process, the data at the location to be updated is first copied to the snapshot disk (out-of-order), and once the copy has been performed the update to the data proceeds. Subsequently, the data structure is updated to indicate that the location has been copied. In this fashion, when the normal data copy process resumes, the normal data copy process will not copy the "updated" data.

The above described processes permit updates to the source disk while allowing the creation of the snapshot disk at the same time without corrupting the snapshot disk with the updated data. However, this technique relies on direct (not sequential as in tape devices) access to the disk that the snapshot copy disk resides to perform the out-of-order update, thus the result is an exact image of the source disk, and as such has yet to be copied to a virtual tape.

SUMMARY

Embodiments of the present invention provide a method and system that overcome the above-described shortcomings of the virtual tape and snapshot methods. In particular, the method of the present invention includes, the acts of receiving information identifying a set of data that is to be copied from the first direct access storage device and mapping destination locations in a second direct access storage device for each element of the set. The destination locations are in a sequence emulating a tape copy. The method also includes the acts of iterating through the set of data. For the each element of the set, the method of the present invention also includes the acts of determining if the element has already been copied to the second direct access storage device, and, if the element has not already been copied, then copying the element to its mapped location in the second direct access storage device.

The method of the present invention may also include the act of, during the iterating act, intercepting a write command to an element that has not yet been copied. If such a write command is intercepted, the method may also copy the element from the first direct access storage device to its mapped location in the second direct access storage device, then execute the write command.

The method of the present invention may retrieve the set of data stored in the first direct access storage device using a first input-output (I/O) access protocol. The first file access protocol may be Enterprise Systems Connection (ESCON) protocol.

The method of the present invention can store the set of data into the second direct access storage device using a second I/O access protocol (SCSI/FC). The second file access protocol can be Open System protocol.

The method of the present invention may also include the acts of identifying the elements of the set of data and calculating computer memory size information of each of the elements in the first direct access storage device.

In addition, the method of the present invention can also include the act of creating an ordered list in order to extract the size information from the first direct access storage device. In this embodiment, each entry of the ordered list is associated with one of the elements of the set. The method may also include the act of storing into each entry physical block addresses of one or more memory blocks that store the element associated with the entry.

The method of the present invention may also include the act of creating an ordered list in order to extract the size information from the first direct access storage device. In this embodiment, each entry of the ordered list is associated with one of the elements of the set. The method may also include the act of storing into each entry physical cylinder and head (CH) addresses of one or more tracks that store the element associated with the entry.

The method may also include the act of creating a file system size table. In this embodiment, each entry of the size table includes information relating to at least one of fields, key fields and data field for one or more records on one of a plurality of tracks. The method may also include the act of updating the file system size table each time a format write I/O command is administered to one of the plurality of tracks.

The method may also include the act of calculating a computer memory size required in the second direct access storage device to copy each element of the set from the first direct access storage device. The method may also include the acts of creating a bit array, each bit of the bit array associated with one of the elements of the set and initializing each bit of the bit array to a first state, wherein the first state of each bit designates that the element associated therewith is not yet copied.

The method may also include the act of changing the first state of one of bits in the bit array, when the element associated with the one of bits has been copied from the first direct access storage device to the second direct access storage device.

The present invention also includes a system of creating a snapshot copy of data stored on a first direct access storage device. The system includes means for receiving information identifying a set of data that is to be copied from the first direct access storage device and means for mapping destination locations in a second direct access storage device for each element of the set, wherein the destination locations are in a sequence emulating a tape copy. The system also includes means for iterating through the set of data that includes means for determining if the each element of the set has already been copied to the second direct access storage device, and means for copying the element to its mapped location in the second direct access storage device if the element has not already been copied.

The system of the present invention may also include means for intercepting a write command to an element that has not yet been copied, wherein, if such a write command is intercepted, copying the element from the first direct access storage device to its mapped location in the second direct access storage device, then executing the write command.

The system of the present invention may also include means for retrieving the set of data stored in the first direct access storage device using a first file access protocol. The first file access protocol can be Enterprise Systems Connection (ESCON) protocol.

The system of the present invention may also include means for storing the set of data into the second direct access storage device using a second I/O access protocol. The second file access protocol is Open System protocol.

The system of the present invention may also include means for identifying the elements of the set of data and means for calculating computer memory size information of each of the elements in the first direct access storage device.

The system of the present invention may also include means for creating an ordered list in order to extract the size information from the first direct access storage device. In this embodiment, each entry of the ordered list is associated with one of the elements of the set. The system may also include means for storing into each entry physical block addresses of one or more memory blocks that store the element associated with the entry.

The system of the present invention may also include means for creating an ordered list in order to extract the size information from the first direct access storage device. In this embodiment, each entry of the ordered list may be associated with one of the elements of the set. The system may also include means for storing into each entry physical cylinder and head (CH) addresses of one or more tracks that store the element associated with the entry.

The system of the present invention may also include means for creating a file system size table. In this embodiment, each entry of the size table may include information relating to at least one of fields, key fields and data field for one or more records on one of a plurality of tracks. The system may also include means for updating the file system size table each time a format write I/O command is administered to one of the plurality of tracks.

The system of the present invention may also include means for calculating a computer memory size required in the second direct access storage device to copy each element of the set from the first direct access storage device.

The system of the present invention may also include means for creating a bit array, each bit of the bit array associated with one of the elements of the set, and means for initializing each bit of the bit array to a first state, wherein the first state of each bit designates that the element associated therewith is not yet copied.

The system of the present invention may also include means for changing the first state of one of bits in the bit array, when the element associated with the one of bits has been copied from the first direct access storage device to the second direct access storage device.

BRIEF DESCRIPTION OF THE FIGURES

The detailed description of embodiments of the present invention showing various distinctive features may be best understood when the detailed description is read in reference to the appended drawing in which.

DETAILED DESCRIPTION

Preferred embodiments of the present invention provide direct snapshot copy to virtual tape that supports out-of-order writes. In particular, the present invention provides sequential access for ordinary reading, writing and other use of the virtual tape and provides direct access capability to support out-of-order writes to the correct corresponding sequential location on the virtual tape. To provide the above-mentioned features, preferred embodiments construct a data structure for mapping data locations in the source disk to corresponding data locations in the virtual tape. In this fashion, if an out-of-sequence write is to be performed, then the data structure may be consulted to determine the location on the virtual tape that should receive the data from the source disk.

Figure 1:
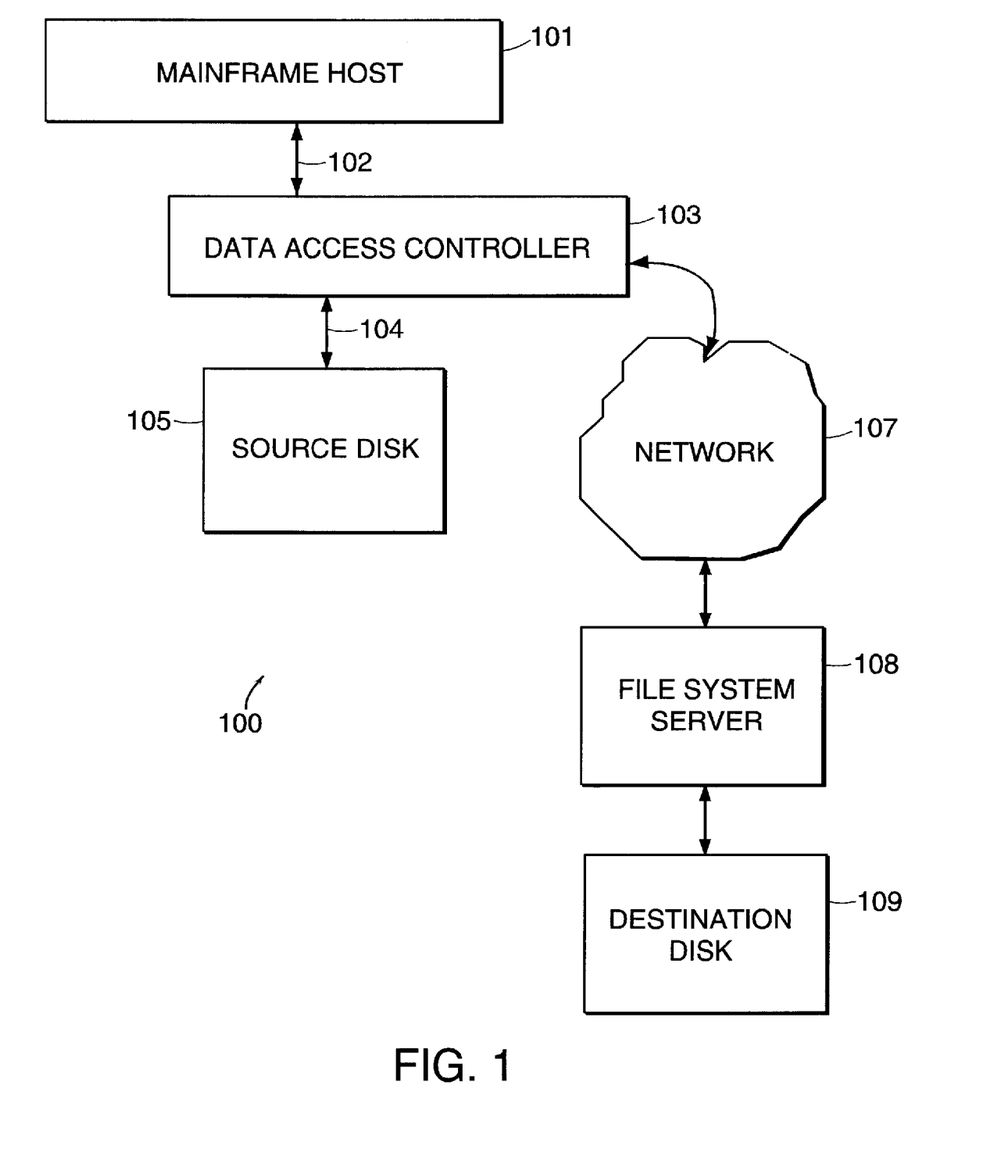
FIG. 1 is a block diagram of a computer system in which embodiments of the present invention operates.

Embodiments of the present invention may operate within an exemplary system 100 as illustrated in FIG. 1. System 100 includes a mainframe host 101 connected to a data access controller 103 via a connectivity link 102. Data access controller 103, in turn, is connected to a source disk 105 via a connectivity link 104. In the illustrated embodiment a destination disk 109 is in communication with data access controller 103 via a file system server 108 and a network 107, such as may be found in Storage Area Networks (SANs).

Mainframe host 101 is preferably a mainframe computer developed and manufactured by International Business Machines Corporation (IBM) of Armonk, N.Y. It should be noted, however, that a personal computer or a UNIX workstation can be used instead of a mainframe computer in at least some embodiments of the present invention.

Controller 103 is configured to manage data (e.g., read from and write to destination disk 109) via file system server 108. Connectivity link 102 is preferably an ESCON link.

Network 107 may be implemented over a Local or Wide Area Network or the Internet or FC SAN or Ethernet. File system server 108 can use an SCSI connectivity or a fibre channel (FC) connectivity to manage read from and write to destination disk 109.

Source disk 105 can be configured to be accessed using a number of different disk addressing methods. Three exemplary disk addressing methods include: (1) Open System addressing method; (2) Enterprise addressing method based on an ECKD architecture with fixed block length and fixed track format; and (3) Enterprise addressing method based on an ECKD architecture with variable track size (e.g., a variable block length scheme or a fixed block length and variable track format scheme).

A disk formatted to use the Open System addressing method is organized in fixed blocks numbered from o to n. The block number uniquely determines the physical location of data on such a disk.

Figure 1A:
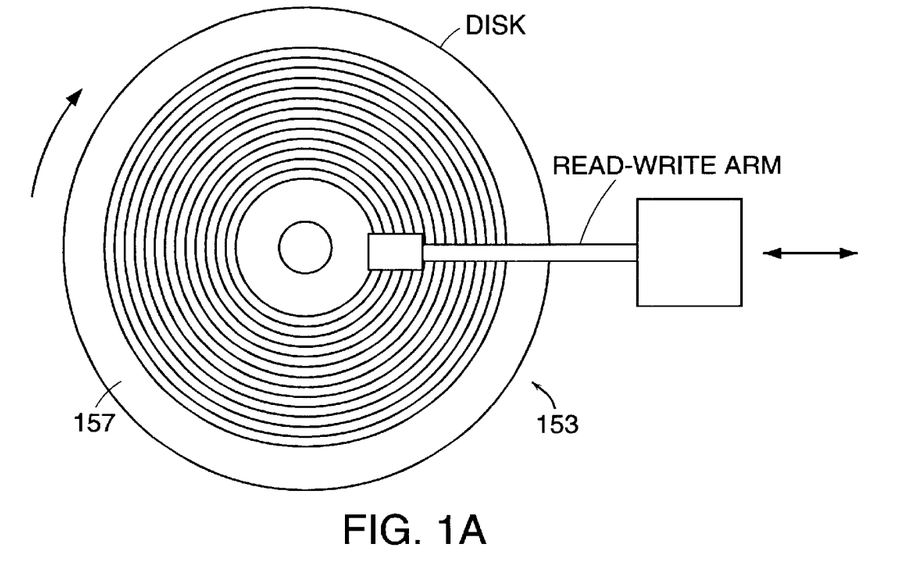
FIGS. 1A and 1B are block diagrams of an exemplary disk devise.
Figure 1B:
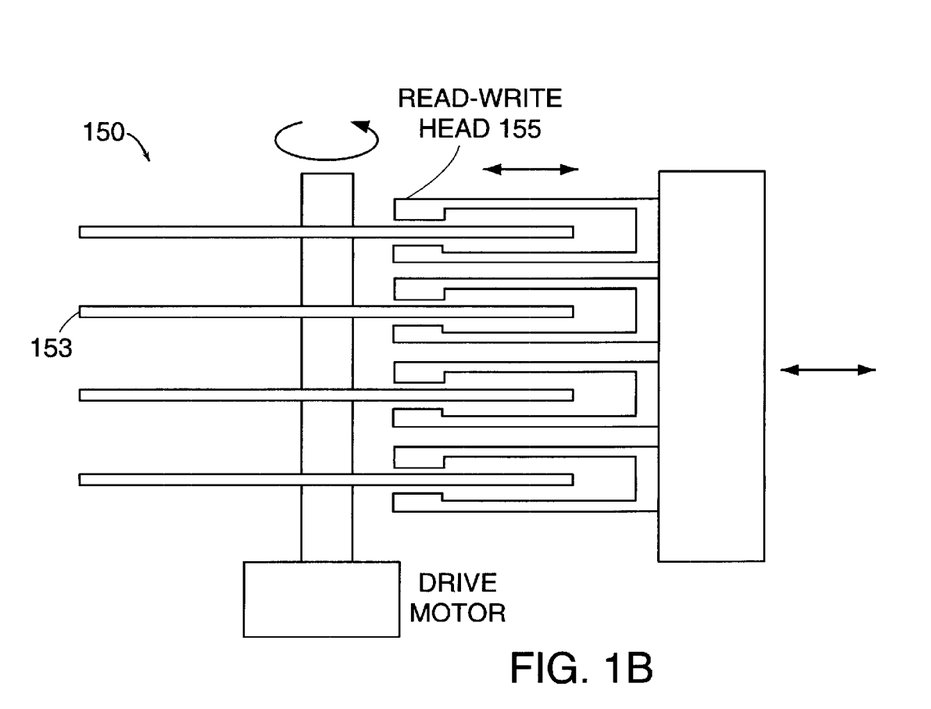

A disk formatted to use either one of the ECKD addressing methods is addressed in a triplet of variables (i.e., Cylinder, Head, and Block number denoted as CHB). An exemplary disk device depicted in FIGS. 1A and 1B illustrates the relationship among the triple of variables. In particular, a disk system may include a number of cylinders 150. In turn, each cylinder includes a number of disks 153 (e.g., fifteen) each of which is configured to be read or written by a corresponding read-write head 155. In turn, each disk includes a number of tracks 157. Data is written on or read from the tracks using block numbers. Hence, a piece of data can be addressed on the disk by the tuplet variables, CHB.

The data can be written to or read from destination disk 109 using the Open System addressing method. However, destination disk 109 can be configured to operate with any one of the above-described disk addressing methods.

Now turning to describe operational features of system 100, at regular intervals (e.g., hourly, daily, monthly, etc.) a user may designate a certain set of data comprising a number of data elements stored in source disk 105 to be backed up (e.g., copied) to destination disk 109. For example the data elements to be backed-up may be files (e.g., designated by their corresponding file names), or other definitions may be used as well (e.g., disk volume identification).

In certain embodiments of the present invention, a backup copy is preferably created in the state as the set of data was stored in source disk 105 at the point in time the backup was initiated while allowing mainframe host 101 to update data stored in source disk 105.

Figure 2:
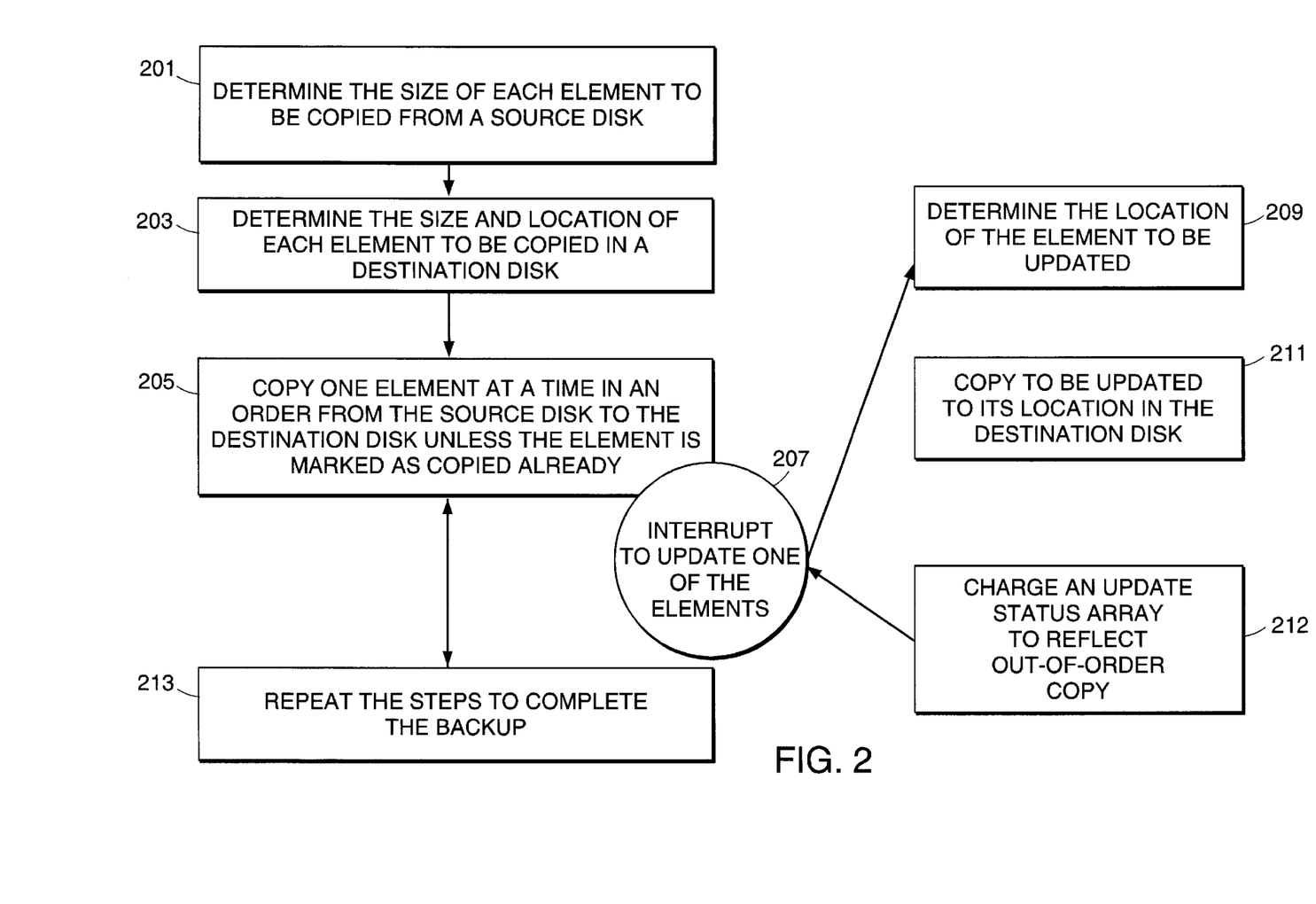
FIG. 2 is a high-level flow chart diagram of processes in accordance with embodiments of the present invention.

Referring conjointly to FIGS. 1 and 2, a high-level description of the backup procedure in accordance with embodiments of the present invention is described. First, the physical size of each element to be copied from source disk 105 is determined 201. Next, in destination disk 109, the physical location of each element to be copied is determined 203. This act can also be referred as mapping. The physical location in destination disk 109 is determined from the physical size information obtained from source disk 105 and from the tape access overhead needed to emulate tape records (e.g., tape headers and footers for each tape file). Following the mapping, one data element is copied at a time (or in parallel) from source disk 105 to destination disk 109 to the physical location calculated in 203. In another embodiment, the data elements can be copied concurrently (e.g., in parallel). As the data elements are copied, values stored in an update status array are changed, details of which are described later.

While controller 103 is copying the data elements from source disk 105 to destination disk 109, mainframe host 101 may send an instruction to update a data element among the data elements that are being copied to destination disk 109. Controller 103 intercepts this instruction. If the data element to be updated has already been copied to destination disk 109, then controller 103 updates the data element as instructed by mainframe host 101 without interrupting the copying process 205. However, if the data element has not already been copied to destination disk 109, then controller 103 interrupts the copying process 207. Controller 103 then determines the location 209, in destination disk 109, of the data element to be updated, which has been calculated in 203. The data element is then copied to that location 211 after which controller 103 updates the element in source disk 105 as requested by mainframe host 101. In addition, the update status array is changed to reflect this out-of-order copy 212. Controller 103 then returns from the interrupt procedure 207 and resumes the copying procedure 205. When the copying procedure 205 reaches the location of the data element that has been copied in 211, controller 103 does not copy the data element from source disk 105.

This approach advantageously allows the backed-up data in destination disk 109 to be identical to the data stored in source disk 105 at the point in time when the backup was initiated. The above processes are repeated until all of the elements designated to be copied have been copied from source disk 105 to destination disk 109. Detailed descriptions of the above described high-level processes are provided below.

First, source disk 105 is scanned to ascertain sizes and locations of the data elements to be backed-up. In the embodiments that scan source disk 105, file sizes, designated as S, and a list of blocks or tracks, designated as E, of the files to be backed up are preferably extracted. This scanning procedure is described for each of the above-mentioned disk addressing methods.

Figure 3:
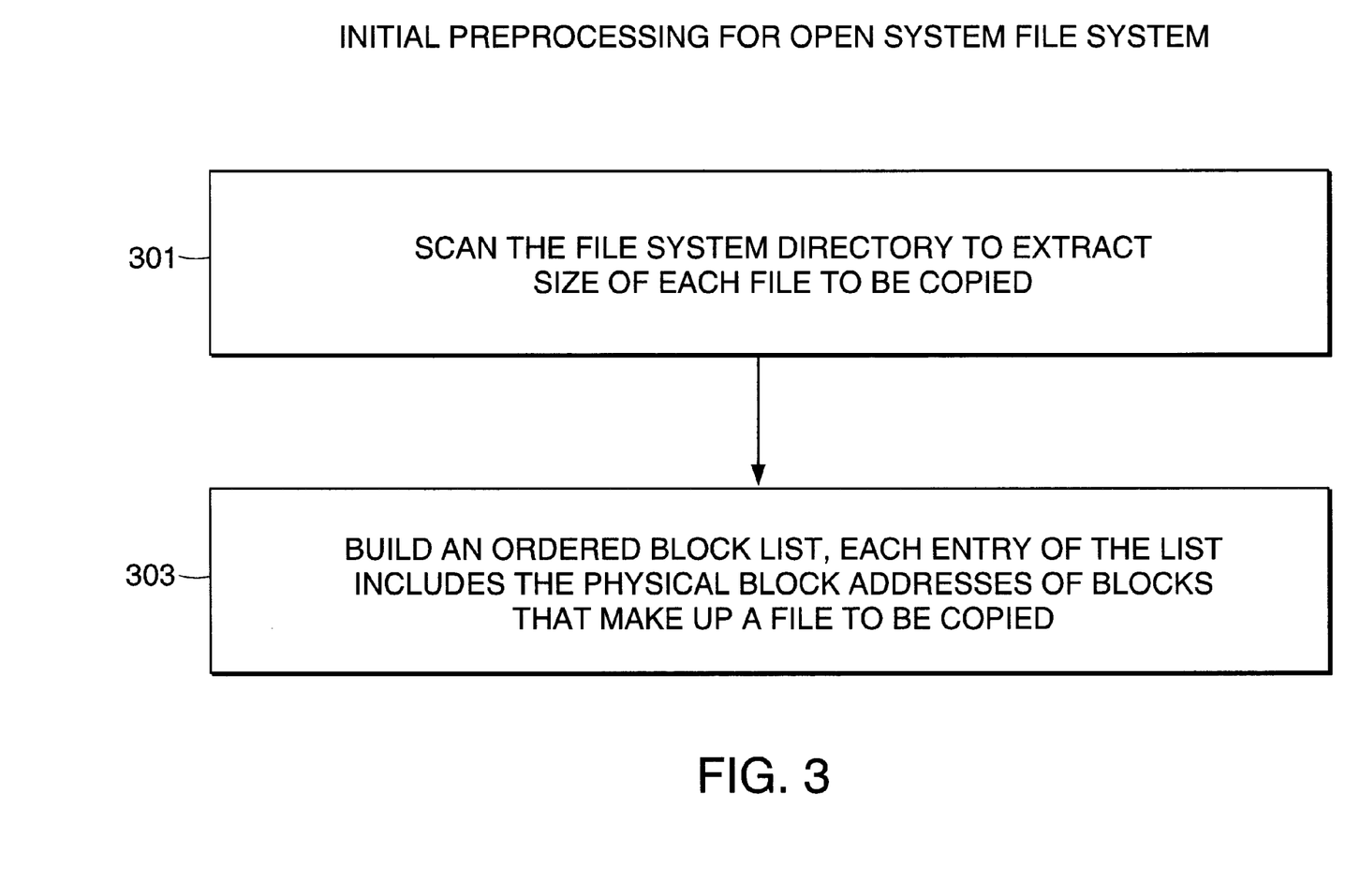
FIG. 3 is a flow chart diagram of initial processing processes when a source disk is formatted to operate in Open System file system in accordance with embodiments of the present invention.

FIG. 3 is a flowchart illustrating the logic to determine the size of each file to be copied when source disk 105 uses the Open System addressing method. In particular, a file system directory having the files to be copied is scanned to locate the files designated to be copied 301. Subsequently, the size $S_i$ for each file i is determined by parsing the directory info to find the size information. An ordered list of the file's blocks, designated as $E_i(j)$, is also created 303. In particular, the ordered list $E_i(j)$ contains the physical block address of block j of file i. This information is obtained by parsing the directory information which includes a set of pointers to the blocks of the file. The size of each file to be copied is calculated using the ordered list $E_i(j)$.

Figure 4:
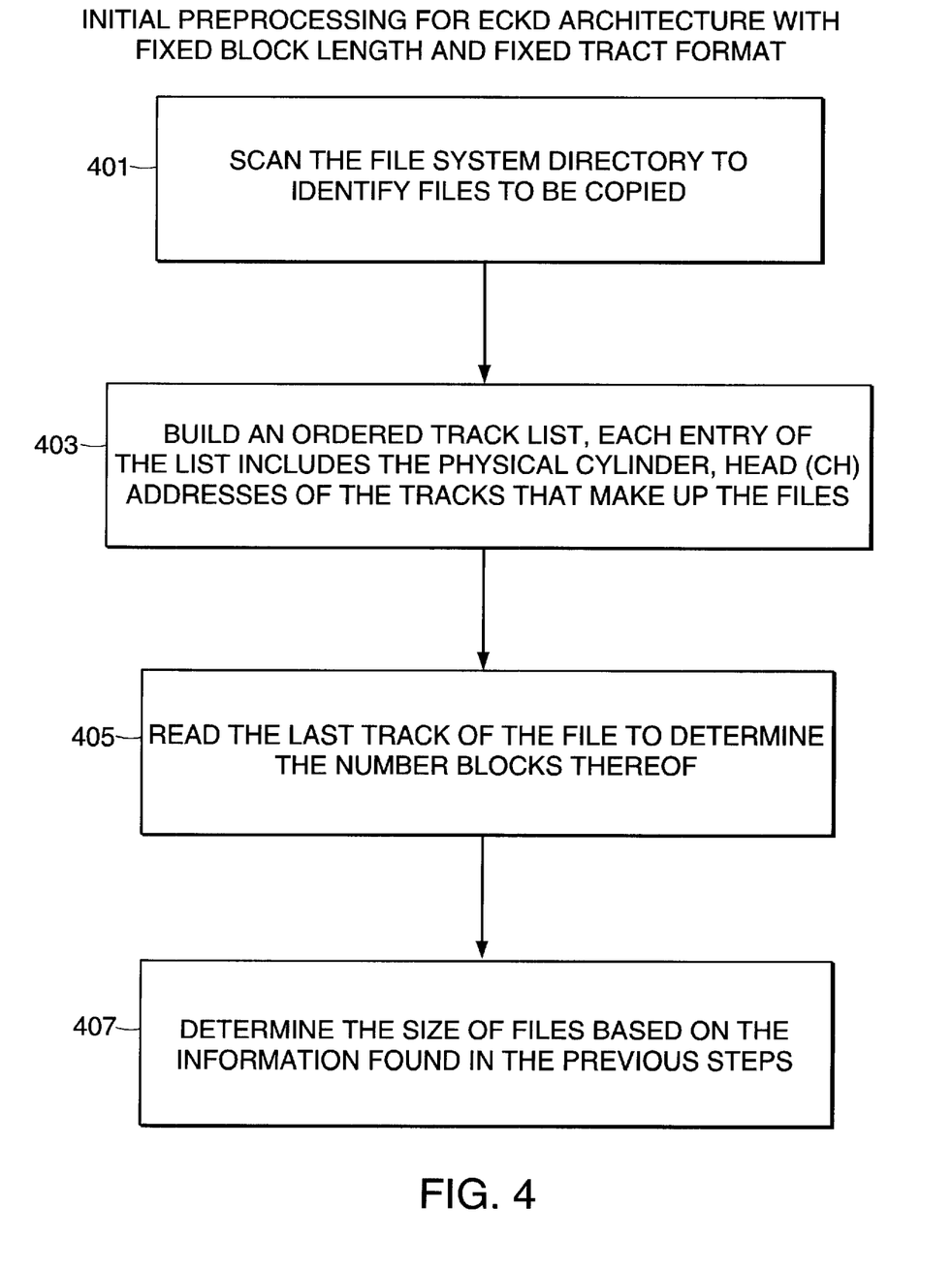
FIG. 4 is a flow chart diagram of initial processing processes when the source disk is formatted to operate in Enterprise file system with fixed block length and fixed track format in accordance with embodiments of the present invention.

FIG. 4 is a flowchart illustrating the logic to determine the size of each data element to be copied when source disk 105 uses the Enterprise file system based on the ECKD architecture with fixed block length and fixed track format. In particular, controller 103 identifies files to be copied 401. For each identified file, designated as i, controller 103 first builds an ordered list corresponding to the file's tracks, designated as $E_i(j)$, 403. The ordered list contains the physical address in the form of CH (Cylinder and Header) of each track, designated as j, for each file to be copied. Controller 103 then reads the last track of the element by reading information in the directory structure to determine the number of blocks, designated as R, on the last track 405. Controller 103 determines the size 407, designated as $S_i$, using the following equation:

$$S_i=(BL+K+C)*n*(TR-1)+(BL+K+C)*R$$

Wherein BL represents the block size of each record on the track; n represents the number blocks per track; TR represents the number of tracks the file occupies; and K and C represent the sizes of each record's key and count fields, respectively.

Figure 5:
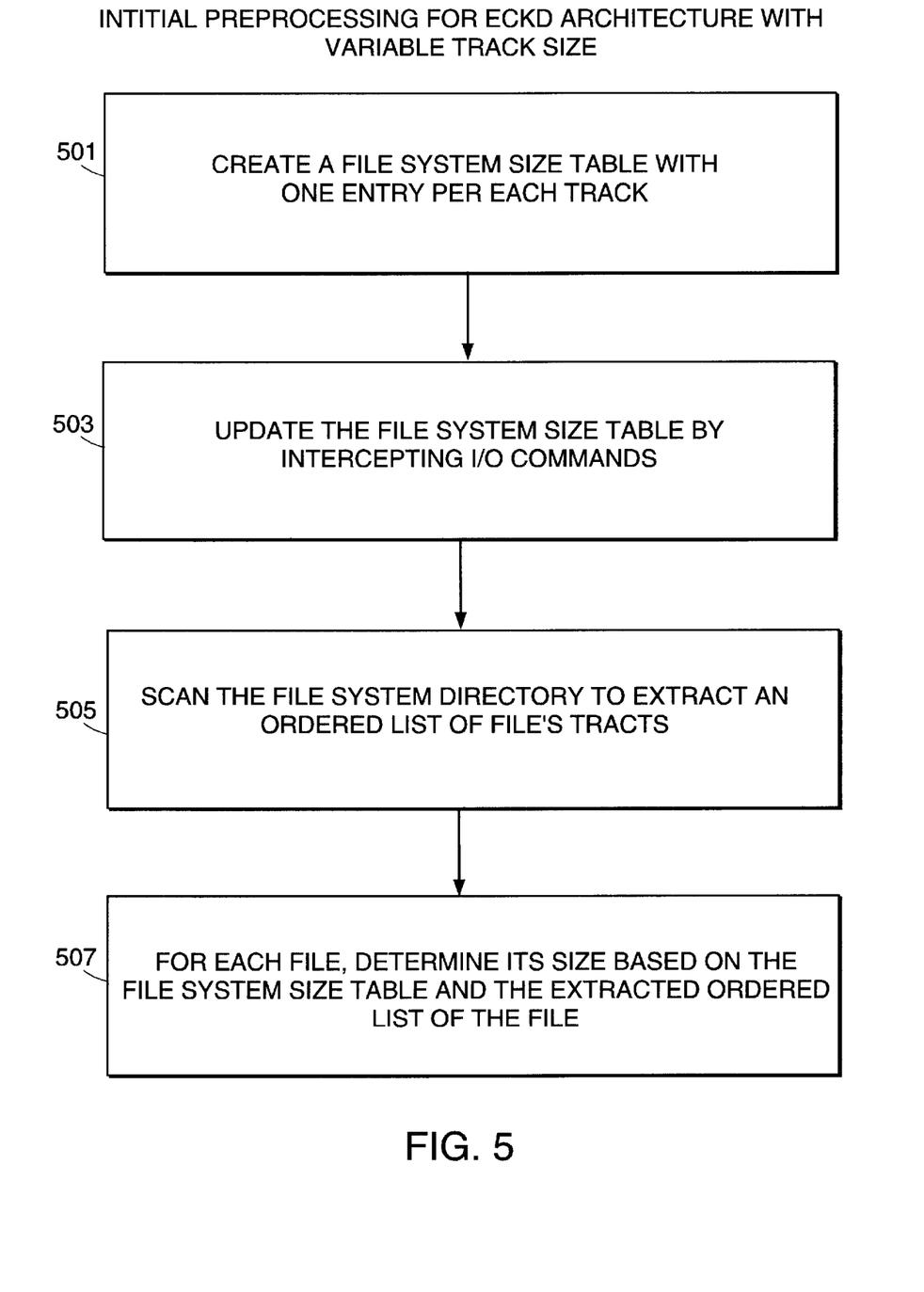
FIG. 5 is a flow chart diagram of initial processing processes when the source disk is formatted to operate in Enterprise file system with variable track size in accordance with embodiments of the present invention.

FIG. 5 is a flowchart illustrating the logic in determining the size of each data element to be copied when source disk 105 uses with the Enterprise addressing method based on the ECKD architecture with variable track size. Controller 103 creates and maintains a "file system size table," designated as $V_i(j)$ (process 501). The file system size table includes one entry for each track of source disk 105. In particular, for each file, designated as i, entry j of $V_i(j)$, contains the size of track j. In turn, $V_i(j)$ includes the sum of sizes of the count fields, key fields, and data fields for all records on the track by reading information in the data directory structure. Subsequent to its creation, the file system size table is preferably updated each time a format write I/O command is administered to tracks 503. In certain embodiments of the present invention, these I/O commands are intercepted by controller 103, and the file system size table is updated accordingly. The above processes are included for the Enterprise file system based on the ECKD architecture with variable track size because track sizes of such architecture may differ from each other. The entries for the tracks in the file system size table are then used in order to determine their sizes 505.

In particular, when the file system size table is created and maintained, size, designated as $S_i$ for file i, may be determined as illustrated in the following exemplary pseudo code processes 507:

Scan the file system directory in order to locate files to be copied;

For each file i to be backed up, construct $E_i$-an ordered list of file's tracks; and For each file i determine it's size $S_i$ with the following equation:

$$S_i = \sum_{j \in E_i} V_i(j)$$

Once the above process of determining the physical sizes of the files to be copied has been completed, controller 103 determines the sizes and locations in the destination disk 109 for each of files to be copied 203. It should be noted that the mapping process is described in connection with destination disks that have been formatted to operate using the Open System addressing method. However, embodiments of present invention also contemplate using disks formatted to operate using other file systems (e.g., the Enterprise addressing methods).

Since destination disk 109 is to emulate a tape (i.e., a virtual tape), for each file, designated as i, the location of its first byte in the tape is determined by the following equation:

$$L_i = \sum_{j=1}^{i-1} (H+T+S_j)$$

© wherein: H and T designate the sizes of a tape header and trailer labels, respectively; $S_j$ designates the file size for file j; $L_i$ designates the byte location of the first byte of file, i, on the virtual tape relative to the beginning of the virtual tape.

The block location of $L_i$ is then determined by the following equation:

$$N_i=\text{FLOOR}\{L_i/B\}+N_0$$

wherein: $N_i$ designates the block location of $L_i$ on destination disk 109; B designates the block size of the Open System disk block size; and $N_O$ represent the first block of the virtual tape on destination disk 109. FLOOR {X} is the integer of X.

Subsequently, the byte offset, designated as $O_i$, of first file's byte in block $N_i$ of destination disk 109 is determined by the following equation:

$$O_i = L_i - (\text{FLOOR}\{L_i/B\})*B$$

Now turning to describe the copying 205, the acts of copying the data from source disk 105 to the destination disk 109 are different depending on the addressing method of source disk 105. In particular, when source disk 105 uses the Open System addressing method, only the underlining block is copied to destination disk 109. When source disk 105 uses one of the Enterprise file systems, the whole track containing the block to be updated is copied. It follows then that the order in which the underlining blocks or tracks are copied is different depending upon which file system is used.

The copying process iterates through the set of data to be copied. For each element in the iteration the logic needs to determine whether or not the block or track has already been copied. Ordinarily, the element has not been copied yet, but, as described above, in certain instances it may have been (for example, to handle a write from the host 101 during the back up procedure). More particularly, in order to perform the interruption process 207, for each file (or block or track), designated as i, controller 103 maintains an array having on or off bit, $BIT_i(j)$, an update status array. The update status array is specified as follows:

$BIT_i(j)=0$ if block or track j has not been copied to destination disk 109.

$BIT_i(j)=1$ if block or track j has been copied already to destination disk 109. It should be noted that in an alternative embodiment the designation of ones and zeros is reversed.

Figure 6:
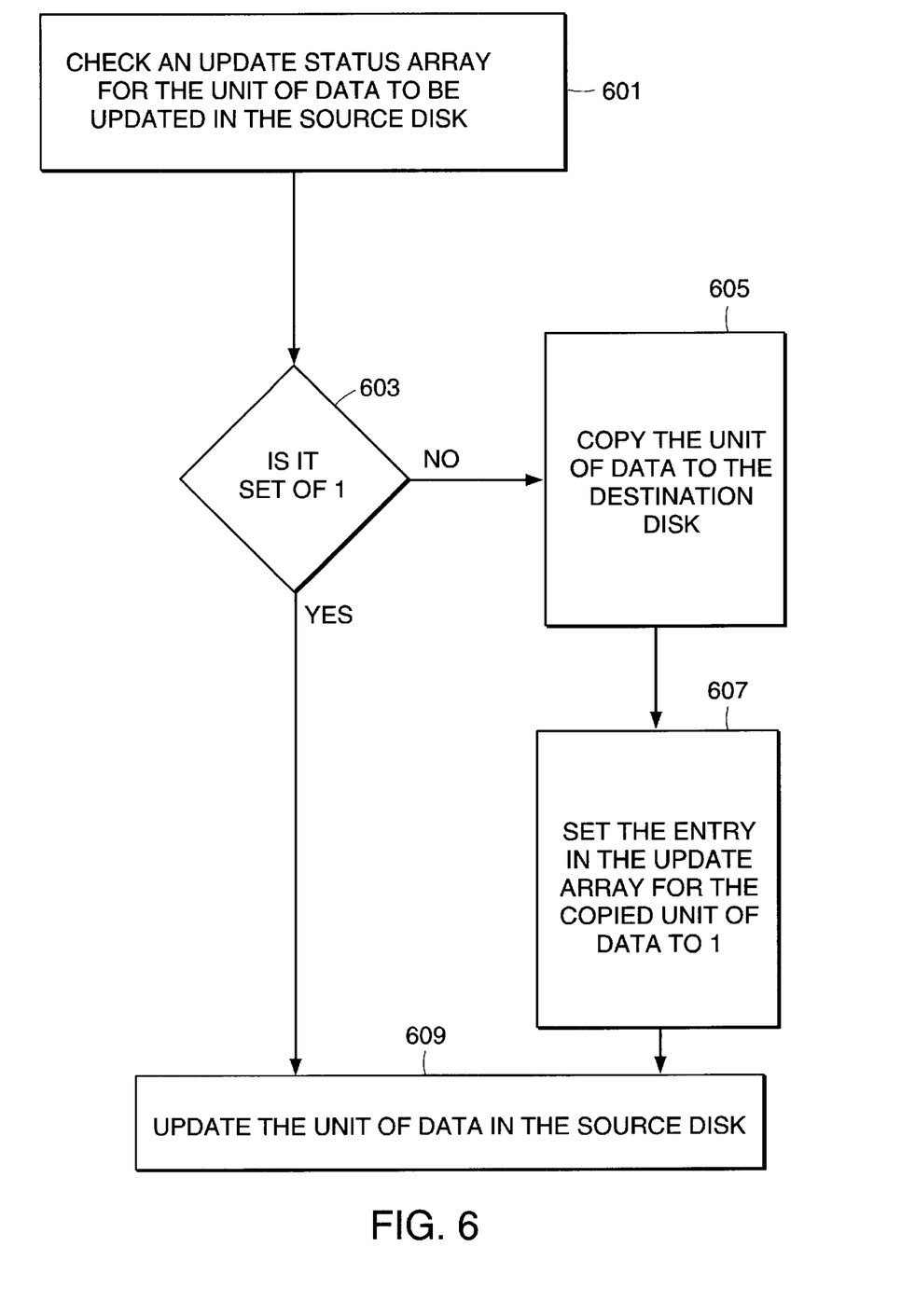
FIG. 6 is a flow chart diagram of processes in copying data from the source disk to a destination disk in accordance with embodiments of the present invention.

When the backup starts, all entries of the update status array are initialized to zero. As the blocks or tracks are copied from source disk 105 to destination disk 109, corresponding entries in the update status array is changed from zero to one. In addition, as noted above in connection with 207, while the copying process is being processed mainframe host 101 may instruct controller 103 to update an element of data. FIG. 6 illustrates the processes involved in handling such an instruction. Controller 103 first checks the entry in the update status array that corresponds to the block or track requested to be updated by mainframe host 101. If the entry is set to one, indicating that the block or track already has been copied to destination disk 109, then controller 103 updates the block or track as instructed by mainframe host 101. If the entry is set to zero, designating that the block or track has not been copied to destination disk 109, then controller 103 copies the block or track (not yet updated) from source disk 105 to destination disk 109 and, then, sets the entry in the update status array corresponding to the just copied block or track to one (designating that the block or track has been copied). Subsequently, the block or track is then updated in source disk 105 as instructed.

Now turning to describe how to copy the data out-of-order, let k designate a physical address of a block to be updated, and let block k belong to block or track i then:

(a) For Open System addressing method, let k designate the j block of file i, that is, $E_i(j)=k$. Let $LU_i(j)$ designate the byte location on destination disk 109 of block j then $LU_i(j)=L_i+B*(j-1)$.

(b) For the Enterprise addressing method based on the ECKD architecture with fix block length and fix track format, let k belong to the j track of file i and let $LU_i(j)$ designate byte location on destination disk 109 of track j then $LU_i(j)=L_i+(BL+K+C)*n*(j-1)$.

(c) For the Enterprise addressing method based on the ECKD architecture with variable track size, lets k belong to the j track of file i and let $LU_i(j)$ designate byte location on the virtual tape of track j.

$$LU_i(j) = L_i + \sum_{l=1}^{j-1} V_i(l)$$

Using the above definitions and designations, the out-of-order copying procedure for Open System addressing method is illustrated in the following pseudo code processes:

Intercept update to block k.
Find entry in E such that $E_i(j)=k$ (to speed this search an inverted list IL of blocks can be used such that for each block k $IL_1(k)=i$ the file to which block k belongs and $IL_2(k)=j$ the relative order number of block k in file i).
if entry found in E then
{
  if $BIT_i(j)=0$ then /*previous data to be copied to virtual tape before update takes place
  {
    $LU_i(j)=L_i+B*(j-1)$
    /*calculate the block number N and the offset O of byte $LU_i(j)$
    N=floor($LU_i(j)/B$)+$N_O$
    O=$LU_i(j)$−(floor($LU_i(j)/B$))*B
    Read block k
    Write block k to virtual tape at block N offset O
    $BIT_i(j)=1$/* mark data secured
  }
}
execute update For either one of the Enterprise addressing methods the following pseudo code illustrates the out-of-order copying process:

Intercept update to block CHB.
Find entry in $E_i(j)$ such that track j contains track CH (to speed this search an inverted list IL of blocks can be used such that for each track CH $IL_1(CH)=i$ the file to which track CH belongs and $IL_2(CH)=j$ the relative order number of track CH in file i).
if entry found in E then
{
  if $BIT_i(j)=0$ then /*previous data to be copied to virtual tape before update takes place
  {
    if fix block length and fix track format then
    $LU_i(j)=L_i+(BL+K+C)*n*(j-1)$
    /*calculate the block number N and the offset O of byte $LU_i(j)$ Else $$LU_i(j) = L_i + \sum_{l=1}^{j-1} V_i(l)$$

N=floor($LU_i(j)/B$)+$N_O$
    O=$LU_i(j)$−(floor($LU_i(j)/B$))*B
    Read track CH
    Write block CH to virtual tape at block N offset O
    $BIT_i(j)=1$/* mark data secured
  }
}
execute update Now turning to describe the processes taking place in destination disk 109, since the starting location ($N_i, O_i$) of each file has been determined already, files can be copied in parallel or sequentially. For example, the outer loop (on i) can be executed in parallel, as illustrated in the following pseudo code processes:

```
for i=1 to number of files to be backed up do /*This loop
    can be done in parallel
{
    write header H for file i starting at location (N_i, O_i)
    for j=1 to number of blocks or tracks in E_i
    {
    if BIT_i(j)=0 then /*if block or track not already copied on
        account of application updates {
        read block or track E_i(O)
        write block or track E_i(O) to virtual tape
        BIT_i(j)=1
        }
    if more than M consecutive reads or writes executed then
        pause for application updates
    }
    write trailer T for file i
}
```

Certain embodiments of the invention implement the controller logic on a platform like the one described in U.S. patent application Ser. No. 09/605,493, entitled "I/O SYSTEM SUPPORTING EXTENDED FUNCTIONS AND METHOD THEREFOR" which is hereby incorporated by reference in its entirety. The platform performs the snapshot copying to the virtualized (emulated) tape and also monitors incoming writes from the host to see if they require the out of order writes described above.

Figure 7:
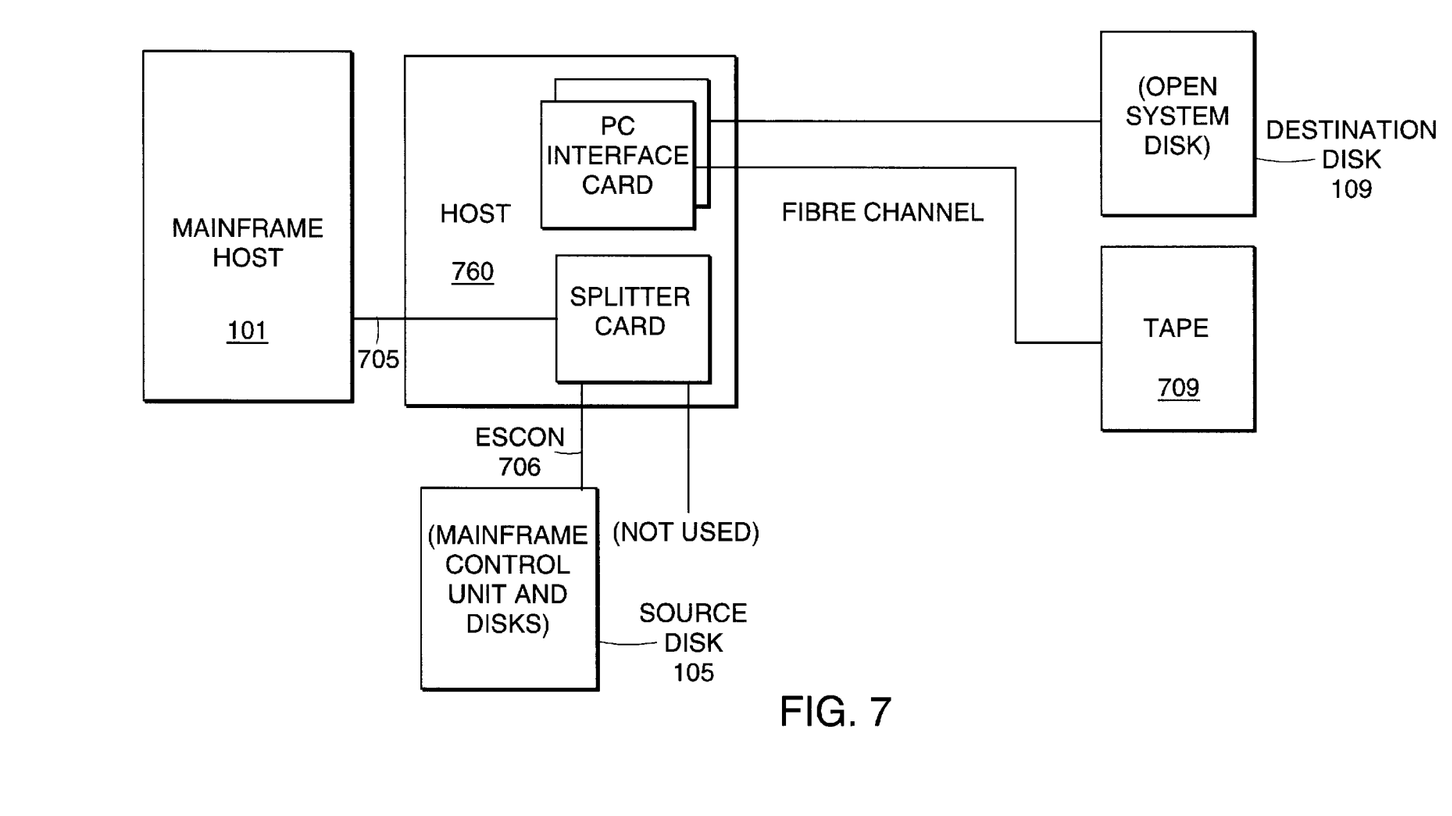
FIG. 7 is a block diagram illustrating the access logic platform in accordance with preferred embodiments of the invention.

More specifically, referring to FIG. 7 and as described in the patent application identified above, among other things, host 760 interacts with and may control and configure the various splitters, and it may communicate with open system disk 109 according to the Open System connectivity links and protocols.

In this embodiment, mainframe host 101 may maintain its data on mainframe storage systems using file systems like PS and VSAM. Mainframe host 101 manages its file systems through tools like SMS, HSM, and DFDSS. Mainframe host 101 accesses its data using ESCON connectivity 706. In the exemplary embodiment, source disk 109 is formatted to operate using one of the Enterprise data access methods.

In this exemplary embodiment, host 760, under programmatic or user control, can define "sessions" in a splitter 700, which instruct the splitter to detect certain commands and addresses on its links and to take specified actions in response thereto. For example, the session may instruct the splitter to (a) detect whether a mainframe link 705 is reading from or writing to certain addresses corresponding to storage locations being backed up and (b) inform host 760 accordingly. In particular, when mainframe host 101 instructs an update to a data element being backed-up, host 760 may intercept such an instruction and initiate an interrupt procedure as described in connection with FIG. 2.

Moreover, in at least some embodiments, host 760 can cause splitter 700 to transmit specified channel command words (CCWs) under the ESCON protocol to a particular connectivity link. Thus, for example, host 760 may create a CCW that would write information to a particular storage location and cause the splitter to send that CCW on a particular link, e.g., 706.

In addition host 760 is configured to directly copy data stored on destination disk 109 on to a tape mounted on a tape driver 709, (e.g., without any rearrangements of data).

As described more fully in the patent application identified above, each intelligent splitter 700 is a multiport programmable device. The splitter can monitor the various ports and detect the commands and addresses flowing through it. Moreover, the splitter can retransmit IO streams received by it on one or more ports, respond to IO streams received by it, alter the received IO stream (either in a control or data portion) and transmit the altered stream, or invoke host 760 in response to a received IO stream. All of the above may be the result of a specific session definition or in response to instructions from host 760.

Under a preferred embodiment, splitter 700 operates on I/O streams at a physical address level, and host 760 is responsible for implementing functionality at a logical level. Under this arrangement, splitter 700 is configured by host 760 to take certain actions when I/O streams fall within prescribed, physical address domains (e.g., physical volumes, tracks, sectors, and physical blocks). This specification of a physical address domain and associated actions to be performed is a "session definition." Host 760 is a separate computing entity (akin to a file server) that is programmed to understand a logical level of addressing abstraction (e.g., databases, file systems, logical records). It includes logic (discussed more fully below) to map logical-level objects to a corresponding physical address domain.

Using this embodiment, the process of determining the physical size of each element to be copied from source disk 105 (201) can be performed by host 760, and splitter 700. In addition, the update status array, BIT_i(j), can be crated and maintained by splitter 700. In another aspect, actual copying of data from source disk 105 to destination disk 109 may be performed by splitter 700 if both disks are mainframe disks, or by splitter and host if the destination disk is an open system disk, while the overall copying process is controlled by host 760.

In general, it should be emphasized that the various components of embodiments of the present invention can be implemented in hardware, software or a combination thereof. In such embodiments, the various components and processes would be implemented in hardware or software to perform the functions of embodiments of the present invention. Any presently available or future developed computer software language or hardware components can be employed in such embodiments of the present invention. For example, at least some of the functionality mentioned above could be implemented using Visual Basic, C, C++, or any assembly language appropriate in view of the processor(s) being used. It could also be written in an interpretive environment such as Java and transported to multiple destinations to various users.

The many features and advantages of embodiments of the present invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method of creating a virtual tape image snapshot copy of data stored on a first direct access storage device, comprising the acts of:

(a) receiving information identifying a set of data that is to be copied from the first direct access storage device;

(b) mapping destination locations in a second direct access storage device for each element of the set, wherein the destination locations are in a sequence emulating a tape copy; and (c) iterating through the set of data and for the each element of the set:

(c-1) determining if the element has already been copied to the second direct access storage device; and (c-2) if the element has not already been copied, then copying the element to its mapped location in the second direct access storage device.

2. The method of claim 1 further comprising the act of:

during the iterating act, intercepting a write command to an element that has not yet been copied, wherein, if such a write command is intercepted, copying the element from the first direct access storage device to its mapped location in the second direct access storage device, then executing the write command.

3. The method of claim 1 further comprising the act of:

retrieving the set of data stored in the first direct access storage device using a first file access protocol.

4. The method of claim 3 wherein the first input-output (I/O) access protocol is Enterprise Systems Connection (ESCON) protocol.

5. The method of claim 1 further comprising the act of:

storing the set of data into the second direct access storage device using a second input-output (I/O) access protocol (SCSI/FC).

6. The method of claim 5 wherein the second file access protocol is Open System protocol.

7. The method of claim 1 further comprising the act of:

identifying the elements of the set of data; and calculating computer memory size information of each of the elements in the first direct access storage device.

8. The method of claim 7 further comprising the act of:

creating an ordered list in order to extract the size information from the first direct access storage device, wherein each entry of the ordered list is associated with one of the elements of the set; and storing into each entry physical block addresses of one or more memory blocks that store the element associated with the entry.

9. The method of claim 7 further comprising the act of:

creating an ordered list in order to extract the size information from the first direct access storage device, wherein each entry of the ordered list is associated with one of the elements of the set;

storing into each entry physical cylinder and head (CH) addresses of one or more tracks that store the element associated with the entry.

10. The method of claim 7 further comprising the acts of:

creating a file system size table, wherein each entry of the size table includes information relating to at least one of fields, key fields and data field for one or more records on one of a plurality of tracks; and updating the file system size table each time a format write I/O command is administered to one of the plurality of tracks.

11. The method of claim 1 further comprising the act of:

calculating a computer memory size required in the second direct access storage device to copy each element of the set from the first direct access storage device.

12. The method of claim 1 further comprising the acts of:

creating a bit array, each bit of the bit array associated with one of the elements of the set; and initializing each bit of the bit array to a first state, wherein the first state of each bit designates that the element associated therewith is not yet copied.

13. The method of claim 12 further comprising the act of:

changing the first state of one of bits in the bit array, when the element associated with the one of bits has been copied from the first direct access storage device to the second direct access storage device.

14. The method of claim 1 further comprising:

copying data stored on the snapshot copy directly on to a tape.

15. The method of claim 1, wherein the act (c) is performed in parallel with respect to the elements.

16. A system of creating a snapshot copy of data stored on a first direct access storage device, comprising:

(a) means for receiving information identifying a set of data that is to be copied from the first direct access storage device;

(b) means for mapping destination locations in a second direct access storage device for each element of the set, wherein the destination locations are in a sequence emulating a tape copy; and (c) means for iterating through the set of data, comprising:

(c-1) means for determining if the each element of the set has already been copied to the second direct access storage device; and (c-2) means for copying the element to its mapped location in the second direct access storage device if the element has not already been copied.

17. The system of claim 16 further comprising:

means for intercepting a write command to an element that has not yet been copied, wherein, if such a write command is intercepted, copying the element from the first direct access storage device to its mapped location in the second direct access storage device, then executing the write command.

18. The system of claim 16 further comprising:

means for retrieving the set of data stored in the first direct access storage device using a first file access protocol.

19. The system of claim 18 wherein the first file access protocol is Enterprise Systems Connection (ESCON) protocol.

20. The system of claim 16 further comprising:

means for storing the set of data into the second direct access storage device using a second input-output (I/O) protocol.

21. The system of claim 20 wherein the second file access protocol is Open System protocol.

22. The system of claim 16 further comprising:

means for identifying the elements of the set of data; and means for calculating computer memory size information of each of the elements in the first direct access storage device.

23. The system of claim 22 further comprising:

means for creating an ordered list in order to extract the size information from the first direct access storage device, wherein each entry of the ordered list is associated with one of the elements of the set; and means for storing into each entry physical block addresses of one or more memory blocks that store the element associated with the entry.

24. The system of claim 22 further comprising:

means for creating an ordered list in order to extract the size information from the first direct access storage device, wherein each entry of the ordered list is associated with one of the elements of the set;

means for storing into each entry physical cylinder and head (CH) addresses of one or more tracks that store the element associated with the entry.

25. The system of claim 22 further comprising:

means for creating a file system size table, wherein each entry of the size table includes information relating to at least one of fields, key fields and data field for one or more records on one of a plurality of tracks; and means for updating the file system size table each time a format write I/O command is administered to one of the plurality of tracks.

26. The system of claim 16 further comprising:

means for calculating a computer memory size required in the second direct access storage device to copy each element of the set from the first direct access storage device.

27. The system of claim 16 further comprising:

means for creating a bit array, each bit of the bit array associated with one of the elements of the set; and means for initializing each bit of the bit array to a first state, wherein the first state of each bit designates that the element associated therewith is not yet copied.

28. The system of claim 27 further comprising:

means for changing the first state of one of bits in the bit array, when the element associated with the one of bits has been copied from the first direct access storage device to the second direct access storage device.

29. The system of claim 16 is further comprising:

means for copying data stored on the snapshot disk to a tape.

30. The system of claim 16, wherein the mean for iterating is further configured to perform the iteration in parallel with respect to the elements.

\* \* \* \* \*